United States Patent [19]
Falke

[11] 3,927,917
[45] Dec. 23, 1975

[54] OPERATOR'S BRAKE VALVE FOR A RAILWAY VEHICLE AIR BRAKING SYSTEM

[75] Inventor: Erich Falke, Munich, Germany
[73] Assignee: Knorr-Bremse GmbH, Munich, Germany
[22] Filed: Dec. 18, 1974
[21] Appl. No.: 533,835

[30] Foreign Application Priority Data
Dec. 20, 1973 Germany............. 2363554

[52] U.S. Cl................. 303/68; 303/79
[51] Int. Cl.² ............. B60T 15/12; B60T 15/60
[58] Field of Search .......... 303/50, 67, 68, 73, 75, 303/76, 78–80

[56] References Cited
UNITED STATES PATENTS

| | | |
|---|---|---|
| 1,527,148 | 2/1925 | Younker et al. ............ 303/68 |
| 2,204,796 | 6/1940 | Farmer ................... 303/79 |
| 3,123,408 | 3/1964 | McIntyre ................. 303/68 |

*Primary Examiner*—Duane A. Reger
*Attorney, Agent, or Firm*—Edmund M. Jaskiewicz

[57] ABSTRACT

A selectively operable valve device for an operator's brake valve for an indirect air braking system on a railway vehicle for the direct or indirect control of pressure in an air line by means of a relay valve comprises a brake valve and a release valve each of which has a valve member urged in the closed direction and displaceable in the open direction. The valve seat engageable by the release valve member comprises a pair of annular concentric seats with an annular space therebetween communicating to the atmosphere so that any air leaking past the release valve member will escape to the atmosphere.

3 Claims, 1 Drawing Figure

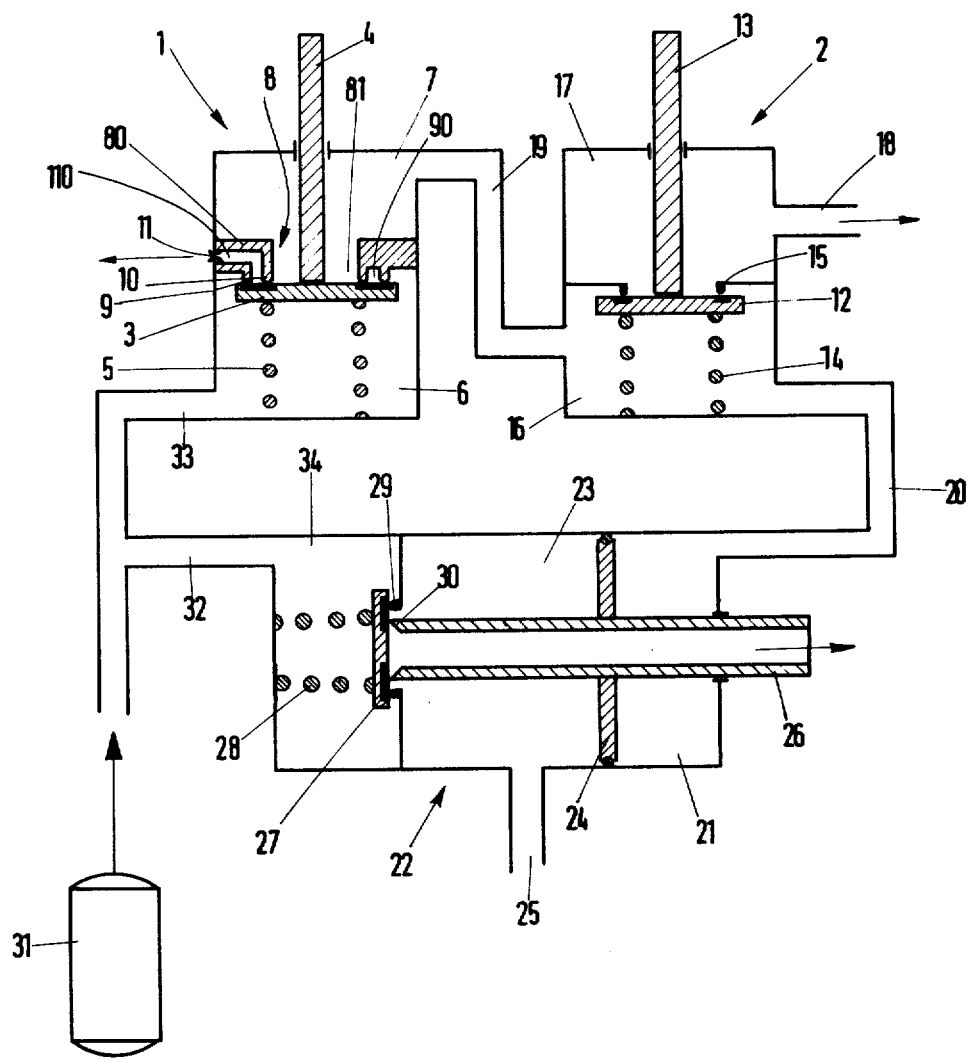

OPERATOR'S BRAKE VALVE FOR A RAILWAY VEHICLE AIR BRAKING SYSTEM

The present invention relates to an operator's brake valve for an indirect air braking system on a railway vehicle for the direct or indirect control of pressure in an air line by means of a relay valve, more particularly, to the valve seat arrangement for the release valve.

It has been known to provide an indirect air braking system for a railway vehicle with an operator's brake valve which includes a selectively operable valve device which, in operation, does not maintain pressure. Such a valve device is generally used for the direct control of pressure in an air line or for an indirect control of such a pressure by means of a relay valve. The valve device generally comprises a brake valve and a release valve having valve members which are preloaded in the closing direction and each valve member engageable with a valve seat and a valve packing. Each of the brake valve and the release valve can be displaced in the open direction by means of a manually operable lever.

In such operator's brake valves in which the operation is a function of the duration of time which the valve is actuated, the release valve generally consists of a simple plunger or push rod valve. Such a valve may be susceptible to leakage. A leakage of the release valve may lead to an unintentional release of an actuated air brake if the air brake on the vehicle is of the type which is actuated by a previous lowering of the pressure as regulated by the operator's brake valve to bring about a corresponding decrease of pressure in the air line leading to the brake cylinder. Leakage past the release valve may permit compressed air to flow into the space immediately following the release valve and thus bring about directly or indirectly an unintentional increase of air in the air line. This increase of air may bring about a gradual release of the air brake until the brake is completely released. It is apparent that such a situation is dangerous because serious accidents may be caused by an unintentional release of the air brake.

In German patent 1,277,296 there is disclosed a shut-off device for an operator's brake valve of air brakes for a railway vehicle wherein unintentional release of the brake is avoided even when there is a leakage past the shut-off member. A venting device is provided which connects to the atmosphere a space immediately subsequent to the shut-off element in the direction toward the operator's brake valve when the shut-off element is closed. In one embodiment of this shut-off device a pipe conveys control pressure from the operator's brake valve into a chamber of the shut-off valve. This chamber contains a sealing valve member which engages a double valve seat in the housing. The valve member is in a radial plane and controls the connection between the operators brake valve and the air line. When the shutoff member is closed, the annular member between the two valve seats and the double valve arranged concentrically and in a single plane communicate with the atmosphere through a passage. As a result of this arrangement, any compressed air which may leak past, particularly from the operator's brake valve, can be led off into the atmosphere and will not flow into the air line. Thus there is avoided the possibility of an unintentional increase of pressure in the air line as a result of leakage in the shut-off device.

This shut-off device has the disadvantage in that it can be used only when the operator's brake valve is not in operation such as would occur when the vehicle is left standing with the brake supplied. In the closed position of the shut-off device it is not possible to exercise any selective control of pressure in the air line by the operator's brake valve. Further, the shut-off device must be actuated independently. If such an actuation should be omitted inadvertently the shut-off device will not be effective and the brake may still be released unintentionally as pointed out above when the vehicle remains standing with the brakes supplied.

It is therefore the principal object of the present invention to provide a novel and improved operator's brake valve of the type as described above.

It is another object of the present invention to provide such an operator's brake valve which prevents unintentional release of air brakes such as would be caused by leakage of the valve device while at the same time not restricting nor hindering the functioning of the operator's brake valve.

According to one aspect of the present invention a selectively operable valve device for an operator's brake valve for an indirect air braking system on a railway vehicle for the direct or indirect control of pressure in an air line by means of a relay valve may comprise a brake valve and a release valve each having a valve member urged into the closed direction and each being manually displaceable in the open direction. The release valve member is engageable with a valve seat comprising a pair of annular concentric seats which define an annular space therebetween. There is a passage leading from the annular space to the atmosphere such that any air leaking past the release valve member will escape to the atmosphere.

The release valve member preferably comprises a plate having a plane surface engaging the two concentric seats which also lie in a plane. A nozzle may be provided in the passage to the atmosphere.

Other objects and advantages of the present invention will be apparent upon reference to the accompanying description when taken in conjunction with the following drawing, which is exemplary, and comprises a schematic representation of the valve device according to the present invention.

The operator's brake valve as illustrated in the drawing comprises a release valve 1 for releasing the brake and a brake valve 2 for the actuation or application of brake. Release valve 1 comprises a sealing plate valve member 3 which is displaceable by an actuating rod 4 for the purpose of releasing the brake by means of a manually operable lever that is not shown against the force of a spring 5. The spring 5 urges the valve member 3 in the closed direction.

The valve in the drawing is shown in its normal or rest condition wherein the lower chamber 6 is separated from an upper chamber 7 in valve 1 by means of the valve member 3. The valve member 3 effects this sealing or shutting-off by engaging a valve seat 8 formed on a separating portion 80 of the valve housing such that the valve seat 8 surrounds a valve opening 81 in the portion 80. The valve seat comprises a double valve seat which consists of two annular concentric separate seats 9 and 10 disposed in a single plane. An annular space 90 is thus defined between the annular seats 9 and 10 and is connected to the atmosphere through a passage 110 in the housing portion 80. A nozzle 11 is mounted in the passage 110.

The brake valve 2 of the operator's brake valve similarly comprises a sealing plate valve member 12 which is displaceable in the opening direction by means of a push rod 13 actuable by a manually operable lever which is not illustrated. A spring 14 acts against the valve member 12 to urge the valve member in the closed direction. Lifting of the valve member 12 from a valve seat 15 brings about a communication between a lower chamber 16 to an upper chamber 17 located on the valve seat side of brake valve 2. The upper chamber 17 is connected to the atmosphere through a passage 18.

The springs 5 and 14 thus load the valve members 3 and 12 respectively in the closing direction of the valves 1 and 2 such that these valve members are brought into contact with their respective valve seats 8 and 15.

The upper chamber 7 of release valve 1 is connected to lower chamber 16 of brake valve 2 by means of a pipe or passage 19. A pipe 20 leads from the lower chamber 16 to a chamber 21 in a relay valve generally indicated at 22. Relay valve 22 includes a piston 24 axially displaceable therein in sealing engagement with the walls of the cylinder so as to define two chambers 21 and 23. An air line 25 leads from the air brake to the relay valve chamber 23. A piston rod 26 extends through the piston 24 and has a longitudinal bore therethrough so that one end of the rod 26 opens to the atmosphere and the other end defines a double valve. The double valve comprises a valve member 27 urged by a spring 28 against the valve seat 292 rigidly and radially constructed in the relay valve 22. The valve member 27 also acts against a second valve seat 30 formed at the end of the piston rod 26. A main air reservoir 31 supplies compressed air through a pipe 32 into a chamber 34 of the relay valve 22 in which chamber the valve member 27 is located. Further, the reservoir 31 is connected through a pipe 33 to the lower chamber 6 of release valve 1.

With respect to the operation of the operator's brake valve of the present invention, when the brake is released the chambers 7, 16, 21 and 23 as well as the air line 25 to the brake cylinder are filled with air at the normal operating pressure level. The higher pressure of air reservoir 31 will exist in chambers 6 and 34 and atmospheric pressure will prevail in the chamber 17. All of the valves are closed.

In order to actuate the brake valve so that the brake is applied, the push rod 13 is displaced downwardly by a manually operable lever for a predetermined period of time which corresponds to the desired stage of braking. Valve member 12 in the brake valve 2 is thus lifted from valve seat 15 against the force of spring 14 to establish communication between the chambers 16 and 17 in the brake valve 2. Upper chamber 7 in the release valve 1 will thus be vented to the atmosphere through pipe 19. Chamber 16 of the brake valve 2 and chamber 21 of relay valve 22 will also be vented to the atmosphere through pipe 20 so that the pressure is lowered in these chambers. The lowering of the pressure will thus be a function of the time during which the push rod 13 is actuated.

The pressure in brake cylinder line 25 and in chamber 23 of relay valve 22 will act on the left side of piston 24 and will thus shift the piston 24 to the right as viewed in the drawing. Movement of piston 24 to the right will separate piston rod 26 from valve member 27 such that valve 30 is opened to enable chamber 23 and brake cylinder line 25 to be vented to the atmosphere until the pressure prevailing in chamber 23 is lowered to the level effective in chamber 21. When this pressure relationship exists, the piston 24 will be shifted to the left to close valve 27, 30. The reduction of the pressure in relay chamber 23 and thus in the brake cylinder line 25 will enable the air brake to be applied as known in the art.

In order to release the brake, the push rod 4 is actuated for a predetermined time period corresponding to the degree of release desired and valve member 3 will be lifted against the force of spring 5 from its valve seat 8 to establish communication between chambers 6 and 7 in the release valve 1. Compressed air under pressure would then flow from main reservoir 31 through chambers 6 and 7 and pipe 19 into lower chamber 16 of brake valve 2 such that the pressure therein is increased. While the valve 3, 8 is opened, some compressed air will also pass into the atmosphere through duct 110 and nozzle 11 which are connected to the annular space 30 between the concentric seats 9 and 10 as described above. Since the opening of the nozzle 11 is relatively small, the loss of compressed air will be quite low.

The increase of pressure in chamber 16 of brake valve 2 will increase the closing force of valve member 12 against valve seat 15 in brake valve 2. This increased pressure will then flow through pipe 20 into chamber 21 of relay valve 22 where it acts on the right side of piston 24, as viewed in the drawing, to shift the piston to the left. The piston rod valve seat 30 will thus be moved against valve member 27 to displace valve member 27 to the left against the force of spring 28 so that the valve member 27 is lifted from valve seat 29. Compressed air will then flow from main reservoir 31 through pipe 32 into chamber 34 of the relay valve, through open valve 29, 27 into chamber 23 of relay valve 22 to supply brake cylinder line 25 with air. As the level of pressure increases in relay valve chamber 23 and in the air line 25 the brake will be released. When the same level of pressure is attained in relay valve chambers 21 and 23, the valve 27, 29 will again be closed.

According to the present invention the valve seat 8 of release valve 1 which is provided with concentric annular seats 9 and 10, as described above, enables the space 90 between the annular seats 9 and 10 to be vented to the atmosphere through nozzle 11. When the vehicle is standing or parked with the brakes applied, the pressure in the air line 25 is lowered. All of the valve members are in the positions as shown in the drawing. If there is any leakage around valve member 3 with respect to the valve seat 8 in release valve 1 the air from reservoir 31 will flow over outer seat 9. The compressed air flowing over seat 9 and into the annular space 90 between the valve seats 9 and 10 will thus escape through passage 110 and nozzle 11 into the atmosphere. As a result of this venting to the atmosphere of this leaked air, there will not be any increase in pressure in the chambers 7, 16 and 21 and as a result there will not be an unintended actuation of piston 24 in relay valve 22. Actually, any leakage between valve member 3 and valve seat 8 will bring about an opposite tendency in that chamber 7 of release valve 1 and also chambers 16 and 21 may possibly be gradually vented which will cause piston 24 to be displaced to the right and thus will bring about an increase of any pressure which may be present in the brake cylinder line 25.

Accordingly, the braking effect will actually be intensified.

A structure wherein a valve member engages a pair of concentric valve seats and the space between the valve seats is vented has been known per se and was even employed in the prior art shut-off device described above. However, the abovedescribed shut-off device existed as a separate structure which had to be operated through a special wrench or the like and as a result was not continuously effective. The present invention specifically provides for an operator's brake valve in which such a valve seat structure functions as a continuously effective control element of the operator's brake valve and as a result cannot inadvertently be disconnected or overlooked. It is therefore not necessary for the operator to carry out a separate step to provide against any unintentional release of the brakes when a braked vehicle remains standing. Thus there is eliminated the possibility of human error which oversight or neglect may cause an unintentional release of the brakes of a standing vehicle which in turn can lead to serious consequences.

In contrast with the seating relationship of valve member 3 with respect to valve seat 8 in release valve 1, the valve seat 15 engageable by valve member 12 in brake valve 2 need not be constructed as a double seat. Actually, if the seating relationship between valve seat 15 and valve member 12 is not absolutely tight and some leakage should occur, the actual braking effect will be assisted. This will occur since any leakage past valve 12, 15 will enable compressed air from partial 21 of relay valve 22 to flow into chamber 17 and thus to the atmosphere by means of pipe 20 and partial chamber 16.

Similarly, valve 27, 29 of relay valve 22 does not require a double seat having a vented intermediate space since here compressed air flowing into chamber 23 because of any leakage will effect a correspondingly small opening of valve 27, 30 through piston 24 and thus will be vented into the atmosphere through hollow piston rod 26. The pressure in brake air line 25 will thus not be increased and accordingly no undesirable release of the brakes will occur.

It will be understood that this invention is susceptible to modification in order to adapt it to different usages, and conditions, and accordingly, it is desired to comprehend such modifications within this invention as may fall within the scope of appended claims.

What is claimed:

1. A selectively operable valve device for an operator's brake valve for an indirect air braking system on a railway vehicle for the direct or indirect control of the pressure in an air line by means of a relay valve, and comprising a brake valve and a release valve each having a valve member urged in the closing direction and each being manually displaceable in the open direction, means for defining a valve seat engageable by said release valve member when closed and comprising a pair of annular concentric seats to define an annular space therebetween, and means for defining a passage from said annular space to the atmosphere whereby any air leakage past said release valve member will escape to the atmosphere.

2. A selectively operable valve device as claimed in claim 1 wherein said release valve member has a plane surface thereon, said two concentric seats being disposed in a plane and engageable with said release valve member plane surface.

3. A selectively operable valve device as claimed in claim 1 and comprising a nozzle in said passage.

* * * * *